(12) United States Patent
Sasaki et al.

(10) Patent No.: US 6,845,125 B2
(45) Date of Patent: Jan. 18, 2005

(54) XDSL TRANSCEIVER

(75) Inventors: Takashi Sasaki, Kawasaki (JP);
Masato Hori, Kawasaki (JP); Kumiko Maruo, Kawasaki (JP); Akira Oshima, Kawasaki (JP); Noriyasu Suzuki, Yokohama (JP); Yoichi Ueda, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 708 days.

(21) Appl. No.: 09/725,372

(22) Filed: Nov. 29, 2000

(65) Prior Publication Data

US 2001/0021219 A1 Sep. 13, 2001

(30) Foreign Application Priority Data

Mar. 7, 2000 (JP) ........................................ 2000-062564

(51) Int. Cl.[7] .................................................. H03H 7/30
(52) U.S. Cl. ...................... 375/219; 375/232; 375/233; 375/350; 375/229; 370/286
(58) Field of Search ............................... 375/232, 233, 375/350, 229; 370/286

(56) References Cited

U.S. PATENT DOCUMENTS

| 4,686,703 A | * | 8/1987 | Bruno et al. ............ 379/406.08 |
| 5,317,596 A | * | 5/1994 | Ho et al. ..................... 375/232 |
| 5,848,061 A | | 12/1998 | Hasegawa |
| 6,072,782 A | | 6/2000 | Wu |
| 6,389,062 B1 | * | 5/2002 | Wu ............................. 375/222 |
| 6,424,674 B1 | * | 7/2002 | Linz et al. ................. 375/220 |
| 6,549,512 B2 | * | 4/2003 | Wu et al. ................... 370/210 |

FOREIGN PATENT DOCUMENTS

| EP | 0 821 171 A1 | 1/1998 |
| JP | 11-341153 | 12/1999 |
| JP | 2000-13343 | 1/2000 |
| JP | 2000-13520 | 1/2000 |
| JP | 2000-22838 | 1/2000 |
| WO | 95/17046 | 6/1995 |

OTHER PUBLICATIONS

IEEE Transactions On Communications, vol. 43, No. 2–4, Feb. 1995 (New York), D C Jones, "Frequency Domain Echo Cancellation for Discrete Multitone Asymmetric Digital Subscriber Line Transceivers", pp. 1663–1672.

* cited by examiner

Primary Examiner—Stephen Chin
Assistant Examiner—Sudhanshu C. Pathak
(74) Attorney, Agent, or Firm—Katten Muchin Zavis Rosenman

(57) ABSTRACT

An xDSL transceiver comprising a transmission unit for transmitting a DMT-modulated signal through a subscriber line as a transmission path and a receiving unit for receiving the DMT-modulated signal from the subscriber line. The xDSL transceiver further comprises an echo signal suppression unit for suppressing the echo signal from the transmission unit to the receiving unit by matching the phase between the frame of the transmission signal and the frame of the receiving signal.

7 Claims, 16 Drawing Sheets

GROUP DELAY
CHARACTERISTIC
OF ECHO

GROUP DELAY
CHARACTERISTIC
OF FILTER

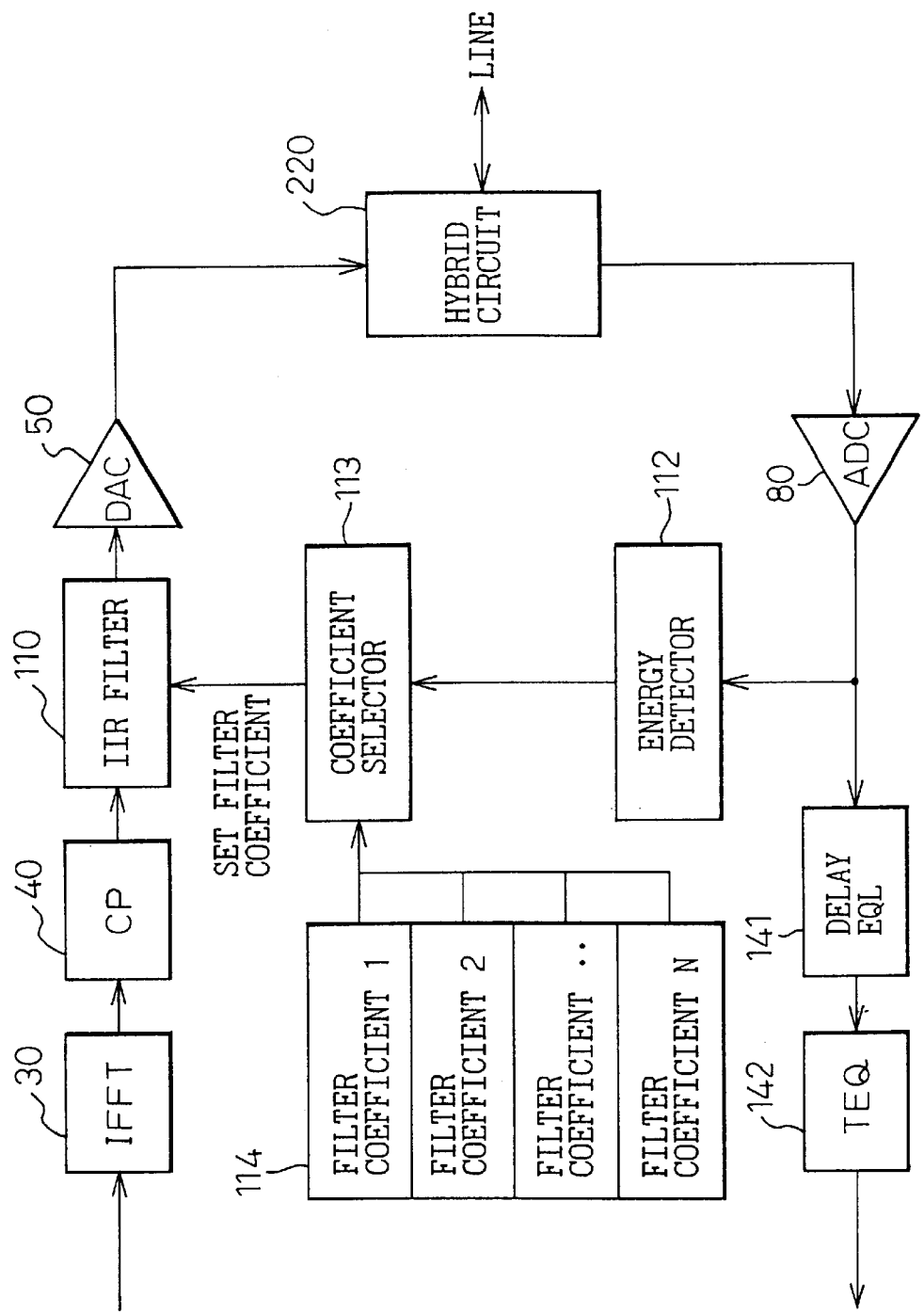

XDSL TRANSCEIVER

BACKGROUND OF THE INVENTION (1) Field of the Invention

The present invention relates to an xDSL (Digital Subscriber Line) transceiver using a discrete multitone modulation scheme utilizing the existing subscriber line as a high-speed data communication line, or in particular to an xDSL transceiver for realizing the suppression of an echo signal from a transmission unit to a receiving unit.

(2) Description of the Related Art (i) Description of ADSL Technique xDSL is known as a technique providing a digital subscriber transmission system utilizing an existing subscriber line as a high-speed communication line. xDSL is a transmission scheme utilizing a telephone line and one of the modulation-demodulation methods. It is roughly classified into two types according to whether the up transmission speed from a remote terminal (hereinafter referred to as a RT side) to a central office (hereinafter referred to as a CO side) is symmetric or asymmetric with the down transmission speed from the CO side to the RT side.

As one of the asymmetric xDSLs, ADSL (Asymmetric DSL) is known. ADSL may be a G.dmt type with the down transmission speed of about 6M bits/sec and a G.lite type with the down transmission speed of about 1.5 M bits/sec, both of which employ the DMT (Discrete Multitone) modulation scheme.

(ii) Description of DMT Modulation Scheme

FIG. 1 is a block diagram showing a configuration of a conventional ADSL transceiver. In the drawing, only the transmission unit on the CO side and the receiving unit on the RT side are shown, and the receiving unit on the CO side and the transmission unit on the RT side are not shown. The receiving unit on the CO side has substantially the same configuration as the receiving unit on the RT side shown in the figure, and the transmission unit on the RT side has substantially the same configuration as the transmission unit on the CO side shown in the figure.

The DMT modulation scheme will be explained with reference to the ADSL transceiver shown in FIG. 1 and taking G.lite as an example. This explanation refers to the modulation-demodulation in down direction from the CO to the RT. Nevertheless, the modulation-demodulation in up direction from the RT to the CO is carried out in a similar manner.

In FIG. 1, the transmission unit on the CO side includes a serial-to-parallel buffer (S-P buffer) 10 for converting serial transmission data to parallel transmission data, an encoder 20, a 256-point inverse fast Fourier transformer (hereinafter referred to as IFFT) 30, a cyclic prefix adder 40, a parallel-to-serial buffer (P-S buffer) 41, a D/A converter 50 and a transmission bit map 60.

The receiving unit on the RT side includes an A/D converter 80 for converting an analog signal from the subscriber line 70 to a digital signal, a time domain equalizer (TEQ) 90, a cyclic prefix remover 100, a serial-to-parallel buffer (S-P buffer) 101, a 256-point fast Fourier transformer 110, a frequency domain equalizer (FEQ) 120, a decoder 130 and a parallel-to-serial buffer (P-S buffer) 140.

Now, the operation will be explained. First, on the CO side, the transmission data is input to the ADSL transceiver and stored in one symbol time (4 kHz) in the serial-to-parallel buffer 10. The stored data is segmented into sections each having a number of transmission bits per carrier predetermined by the transmission bit map 60 and output to the encoder 20. In the encoder 20, each input bit string is converted into signal points for quadrature amplitude modulation and output to an IFFT 30. The IFFT 30 performs the quadrature amplitude modulation for each signal point by inverse fast Fourier transform and outputs the resulting signal to the parallel-to-serial buffer 41. In the process, a cyclic prefix adder 40 adds 240 to 255 samples of the output of the IFFT 30 to the head of the DMT symbol as a cyclic prefix. The output of the P-S buffer 41 is sent to the D/A converter 50 where it is converted into an analog signal at a sampling frequency of 1.104 MHz and, through a metallic line 70, is transmitted to the subscriber side.

In the receiving unit in the ADSL transceiver on the RT side, the analog signal is converted into a digital signal at 1.104 MHz by the A/D converter 80, and output to the time domain equalizer (TEQ) 90. In the TEQ 90, the signal is processed in such a manner that the inter-symbol interference (ISI) may be contained within the 16-sample cyclic prefix, and then stored in an amount corresponding to one DMT symbol in the S-P buffer 101. At the same time, the cyclic prefix is removed by the cyclic prefix remover 100. The outputs of the S-P buffer 101 are input to the FFT 110. In the FFT 110, a fast Fourier transform is performed to generate (demodulate) signal points. After that, the demodulated signal points are applied to the FEQ 120 where the effect on the amplitude and phase caused by the passage through the metallic line 70 is compensated for each carrier of a different frequency, and is decoded by the decoder 130 according to the receiving bit map 150 holding the same values as those in the transmission bit map 60. The decoded data is stored in the P-S buffer 140 and constitutes the receiving data as a bit string.

(iii) Explanation of the Echo Signal

FIG. 2 is a block diagram for explaining the echo signal in the conventional ADSL transceiver. In the drawing, unit #1 is one ADSL transceiver and unit #2 is the other ADSL transceiver. The transceivers are connected to each other by a subscriber line 240. Unit #1 includes a transmission unit 210 having the component elements designated by reference numerals 10 to 60 in FIG. 1, a receiving unit 230 having the component elements designated by reference numerals 80 to 150 in FIG. 1, and a hybrid circuit 220 for sending the transmission signal to the subscriber line 240 and delivering the receiving signal from the subscriber line 240 to the receiving unit. Unit #2 has the same configuration as unit #1.

The signal output from the transmission unit 210 of unit #1 is output to the subscriber line 240 through the hybrid circuit 220. The hybrid circuit 220 is so designed that the transmission signal thereof does not echo into the receiving unit 230. In an ideal hybrid circuit having a perfect impedance matching with the subscriber line, an echo of the transmission signal to the receiving unit 230 does not occur. Actually, however, the line characteristic varies from one subscriber line to another depending on the length, diameter, the condition of the bridge tap and the temperature, etc. of the subscriber line 240. Therefore, an impedance mismatch is caused in the hybrid circuit 220 so that the transmission signal from the transmission unit 210 echoes into the receiving unit 230 in the same system. This echo component constitutes a noise for the receiving unit 230 and is a cause of deterioration of the data transmission characteristics.

FIG. 3 is a diagram showing a spectrum of the transmission signal and the receiving signal in the conventional ADSL transceiver on the RT side. The spectrum of the transmission signal and the receiving signal of the ADSL transceiver on the CO side is similar to that of FIG. 3 and is not shown.

Conventionally, an effort has been made to remove the echo making up an echo signal from the transmission unit to the receiving unit using a sub-band filter. This conventional method will be explained with reference to FIG. 3.

In FIG. 3, a thin solid line indicates the receiving signal (down signal) from the CO side, and a two-dot chain indicates the transmission signal (up signal) from the RT side to the CO side. The receiving signal has a main component (in-band component) on the comparatively high-frequency band side and an out-of-band component on the comparatively low-frequency band side. The transmission signal, on the other hand, has a main component on the comparatively low-frequency band side, and an out-of-band component on the comparatively high-frequency band side. The receiving signal (down signal) is attenuated while passing through the subscriber line, and therefore in the drawing, is lower in gain than the transmission signal. As shown in FIG. 3, conventionally, in order to secure a sufficient S/N of the receiving signal against the out-of-band component of the transmission signal, a transmission low-pass filter (transmission LPF) for suppressing the out-of-band component of the receiving signal and passing only the main component of the transmission signal is arranged on the output side of the transmission unit 210, while a receiving high-pass filter (HPF) for removing the main component of the transmission signal and passing only the main component of the receiving signal is arranged on the input side of the receiving unit 230, thereby suppressing the echo signal from the transmission unit to the receiving unit.

For the S/N ratio of the receiving signal to be sufficiently large against the out-of-band component of the transmission signal, however, a transmission LPF and a receiving HPF having a characteristic with a sharp rise and a sharp fall are required, resulting in a large number of stages in the respective filters.

As explained above, in the conventional method using the transmission LPF and the receiving HPF, the order of the filter for suppressing the echo component must be increased and, therefore, the hardware including a filter, if any, is also increased in size. In the case where the filter is digitally configured with a digital signal processor (DSP) or the like, on the other hand, the processing amount is so increased as to require a DSP high in processing capacity. In either case, therefore, the system cost is increased. It is for this reason that inexpensive means for suppressing the echo from the transmission unit to the receiving unit is desired.

SUMMARY OF THE INVENTION

In order to solve the problem described above, the object of the present invention is to provide an xDSL transceiver capable of suppressing the echo signal by adjusting the frame boundaries of the transmission signal and the receiving signal.

To attain the above object, according to a first aspect of the invention, there is provided an xDSL transceiver comprising an echo signal suppression unit for suppressing the echo signal from the transmission unit to the receiving unit by matching the phase of the frame of the transmission signal and that of the receiving signal with each other.

According to a second aspect of the invention, there is provided an xDSL transceiver of the first aspect, in which the echo signal suppression unit is included in the transmission unit and has a phase compensator for making the frame boundaries of the carriers of the echo signals from the transmission unit to the receiving unit to be the same for all the frequencies.

According to a third aspect of the invention, there is provided an xDSL transceiver of the second aspect, in which the receiving unit includes phase compensation degree determining unit for determining the degree of phase compensation of the phase compensator in the transmission unit by analyzing the receiving signal.

According to a fourth aspect of the invention, there is provided an xDSL transceiver of the first aspect, in which the echo signal suppression unit is included in the receiving unit and has a phase compensator for making the same frame boundary of the carrier of the echo signal from the transmission unit to the receiving unit for all the frequencies.

According to a fifth aspect of the invention, there is provided an xDSL transceiver of the fourth aspect, in which the phase compensator is configured with a cascade connection of a delay equalizer for correcting the group delay distortion of the echo signal from the transmission unit and a time domain equalizer for reducing the inter-block interference in the output of the delay equalizer.

According to a sixth aspect of the invention, there is provided an xDSL transceiver of the fourth aspect, in which the phase compensator is configured with a single equalizer of an FIR Filter type having the same function as a cascade connection of a delay equalizer for correcting the group delay distortion of the echo signal from the transmission unit and a time domain equalizer for reducing the inter-block interference in the output of the delay equalizer.

According to a seventh aspect of the invention, there is provided an xDSL transceiver of the first aspect, in which the transmission unit includes a portion of the echo signal suppression unit and the receiving unit includes the other portion of the echo signal suppression unit.

BRIEF DESCRIPTION OF THE DRAWINGS

FIG. 17 is a block diagram showing the configuration of a portion of the ADSL transceiver according to a sixth embodiment.

DESCRIPTION OF THE PREFERRED EMBODIMENTS

Figure 1:
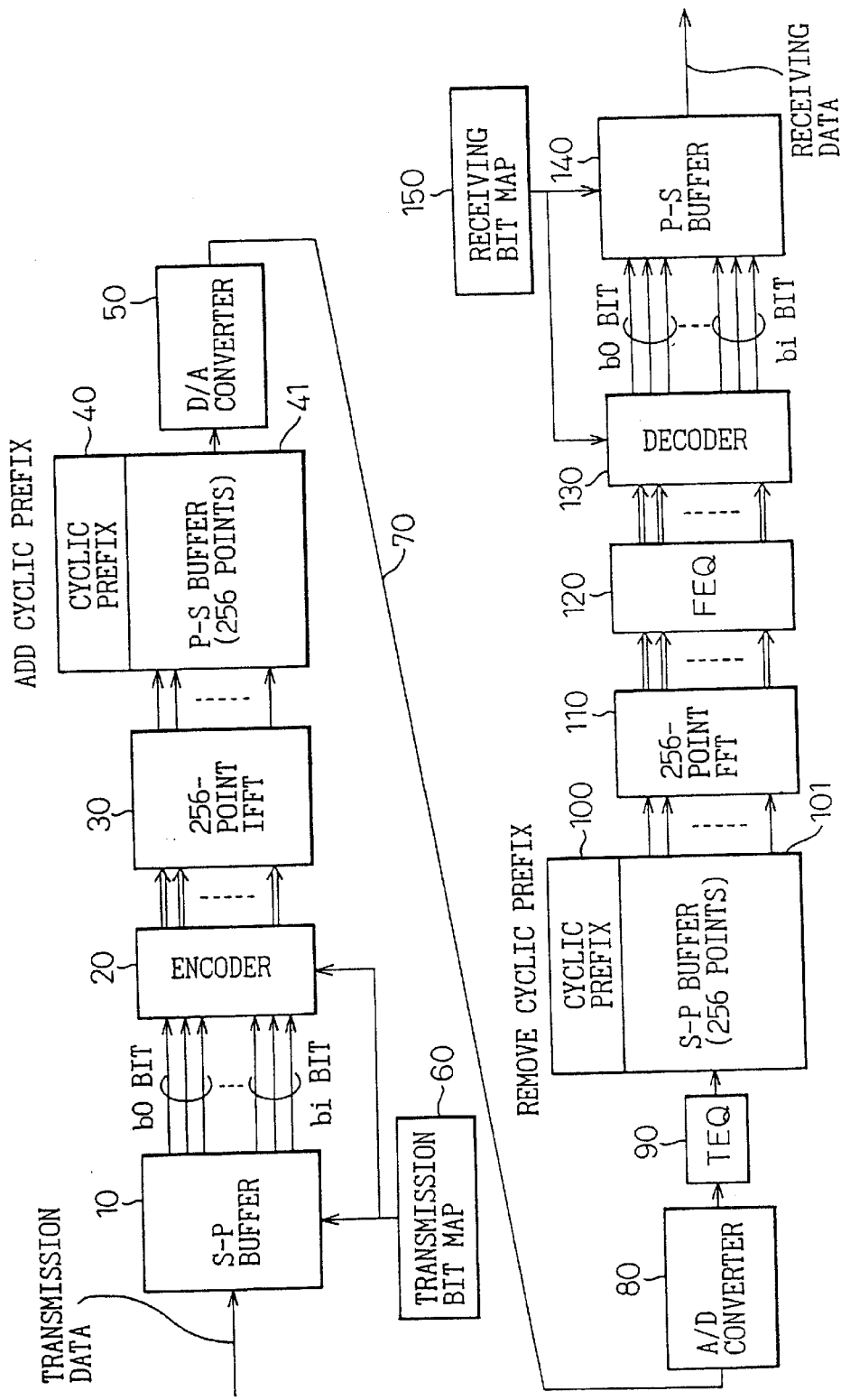
FIG. 1 is a block diagram showing a configuration of the conventional ADSL transceiver.

An embodiment of the invention will be explained in detail below with reference to the drawings. In all the drawings, the same reference numerals designate the same or similar component parts, respectively.

(i) Phase Matching of Receiving Frames

Figure 4:
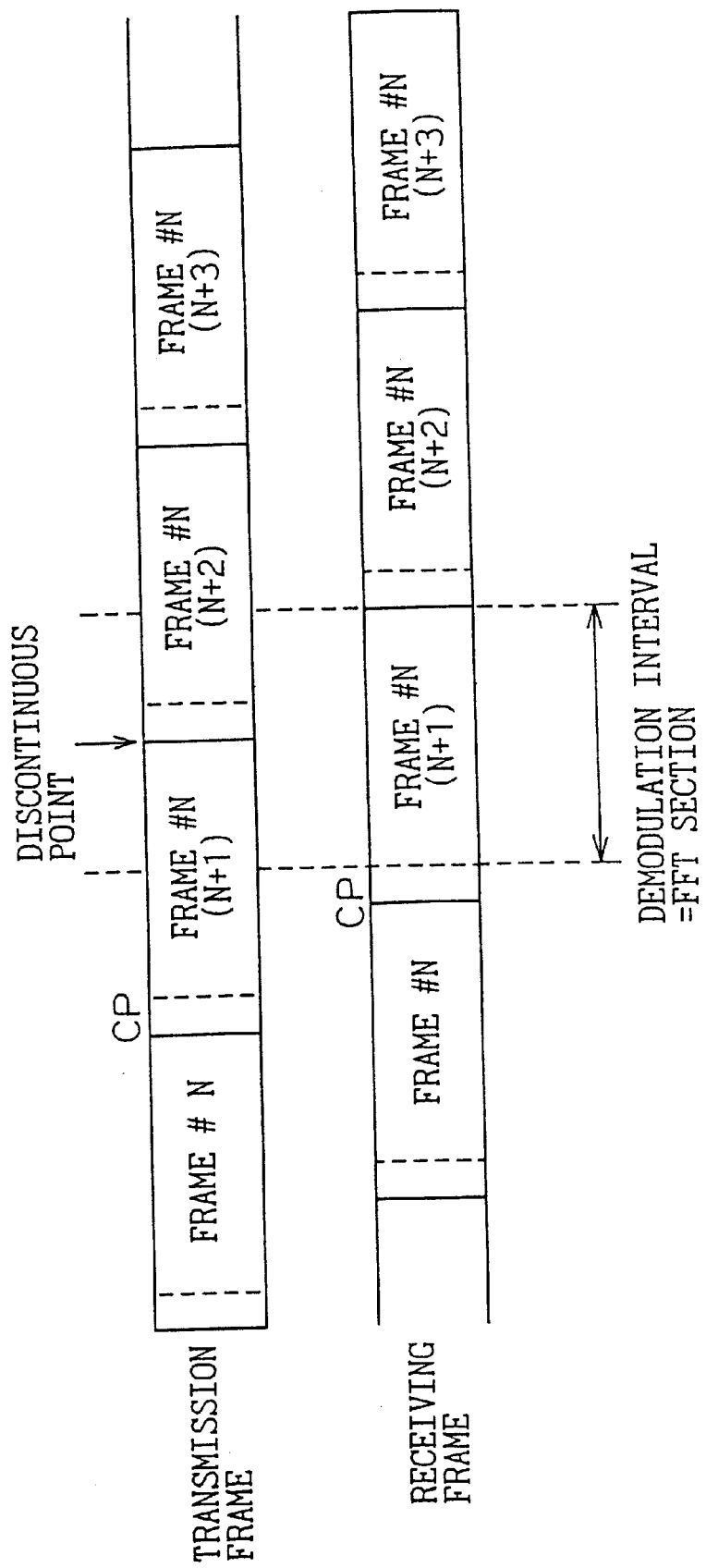
FIG. 4 is a diagram for explaining the discontinuous point in the transmission signal for demodulation of the receiving signal using the conventional ADSL transceiver.

FIG. 4 is a diagram for explaining a discontinuous point in the transmission signal at the time of demodulating the receiving signal using the conventional ADSL transceiver. As shown in FIG. 4, for the demodulation, an FFT is performed in the frame boundaries of the receiving signal to extract signal points of each carrier. Thus, the spectrum of the receiving signal component contains substantially no out-of-band component. However, in view of the fact that the frame boundary of the transmission frame which has been reflected as an echo is not always coincident with the FFT section for demodulation of the receiving signal, a discontinuous point is often contained in the FFT section. As a result, a transmission out-of-band component is generated and constitutes noise in the received signal.

Figure 5:
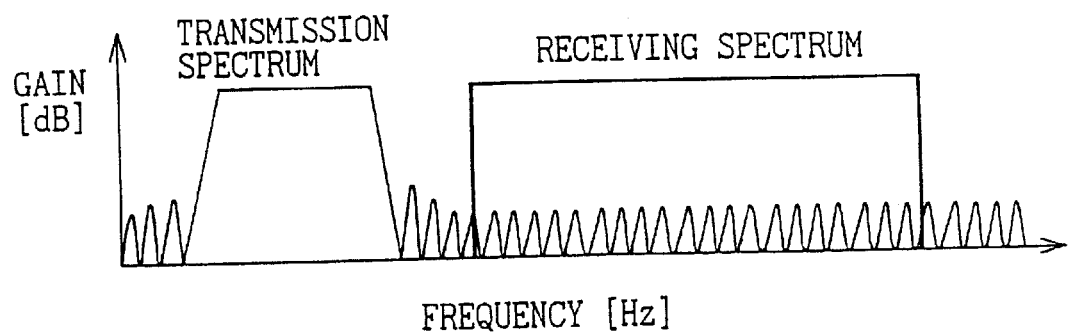
FIG. 5 is a graph showing the state in which the out-of-band component of the transmission spectrum in the conventional ADSL transceiver enters the band of the receiving spectrum and thus causes a noise of the receiving signal.

FIG. 5 is a graph showing the state in which the transmission out-of-band component of the transmission spectrum enters the band of the receiving spectrum to constitute noise in the received signal as described above.

(ii) Phase Control of Transmission Frames

Figure 6:
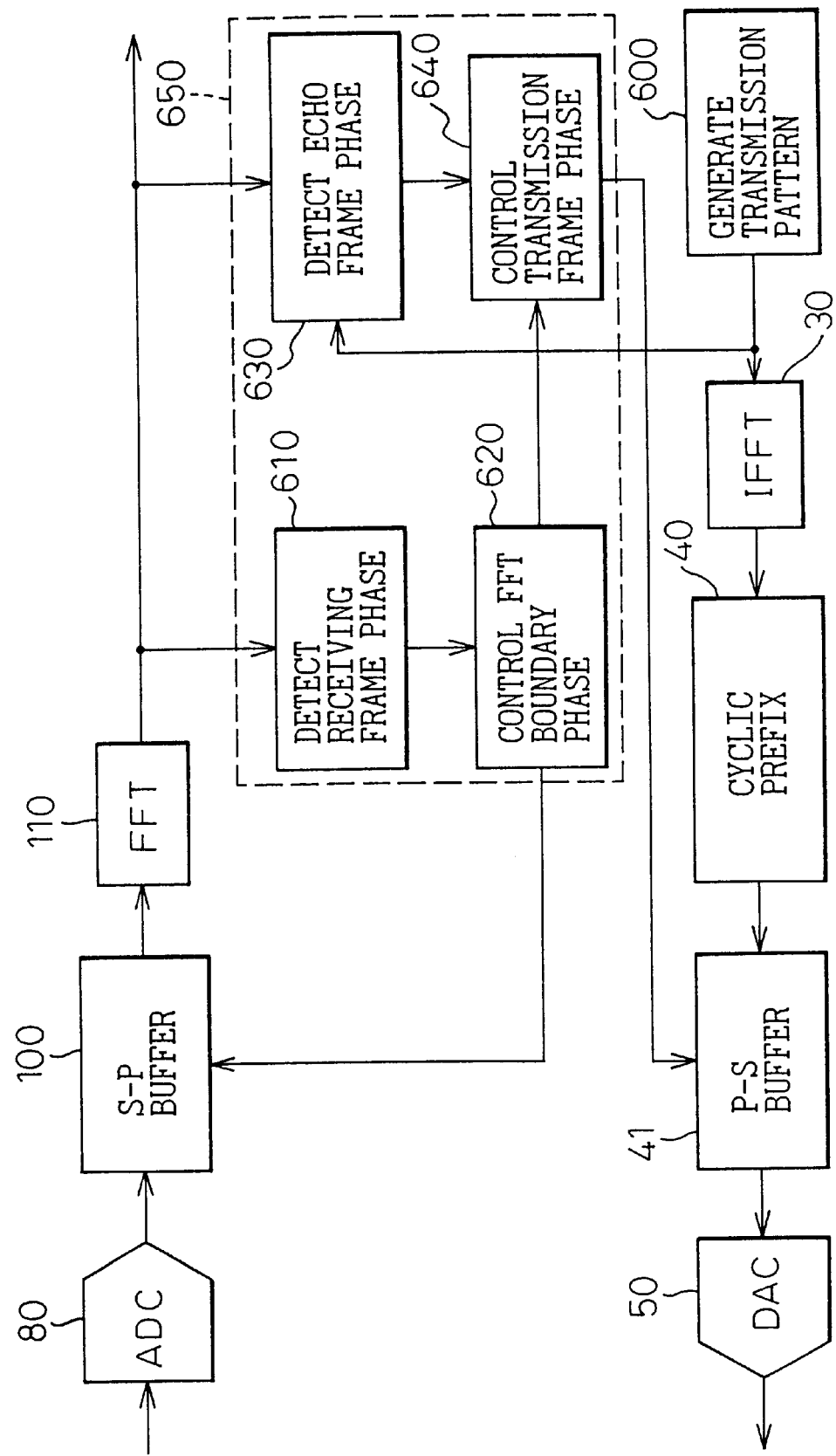
FIG. 6 is a block diagram showing a portion of the configuration of the ADSL transceiver according to a first embodiment of the invention.

FIG. 6 is a block diagram showing a portion of the configuration of the ADSL transceiver according to a first embodiment of the invention. As shown in FIG. 6, the ADSL transceiver according to this embodiment comprises the same component parts as the ADSL transceiver shown in FIG. 1, i.e. the receiving unit including the A/D converter 80, the S-P buffer 100 and the FFT 110, and the transmission unit including the IFFT 30, the cyclic prefix adder 40, the P-S buffer 41 and the D/A converter 50. In addition, the ADSL transceiver according to this embodiment comprises, between the receiving unit and the transmission unit, an echo signal suppression unit 650 configured with a receiving frame phase detector 610, a FFT boundary phase controller 620, an echo frame phase detector 630 and a transmission frame phase controller 640.

Now, the operation will be explained. A fixed pattern signal for training is generated between the ADSL transceivers by the IFFT 30 at the time of initial training. The data is passed through the cyclic prefix adder 40 without doing anything at the time of initial training, enters the P-S buffer 41 and is converted into an analog signal at the sampling rate by the D/A converter (DAC) 50. This transmission signal is used for training the equalizer in the receiving unit of the ADSL transceiver on the opposite party. At the same time, the receiving unit of the ADSL transceiver of the own party is rendered to perform the following operation thereby to match the frame phases for transmission and receiving.

Figure 2:
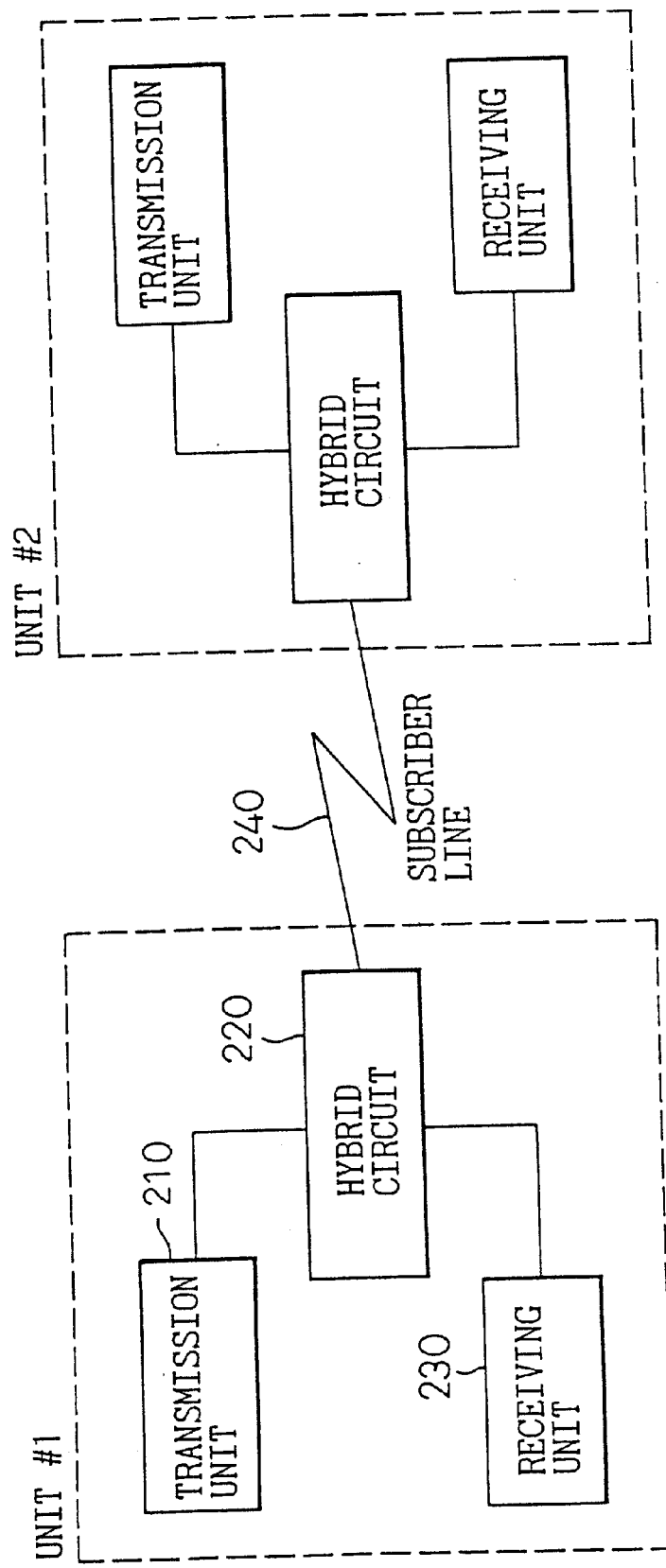
FIG. 2 is a block diagram for explaining the echo signal in the conventional ADSL transceiver.
Figure 3:
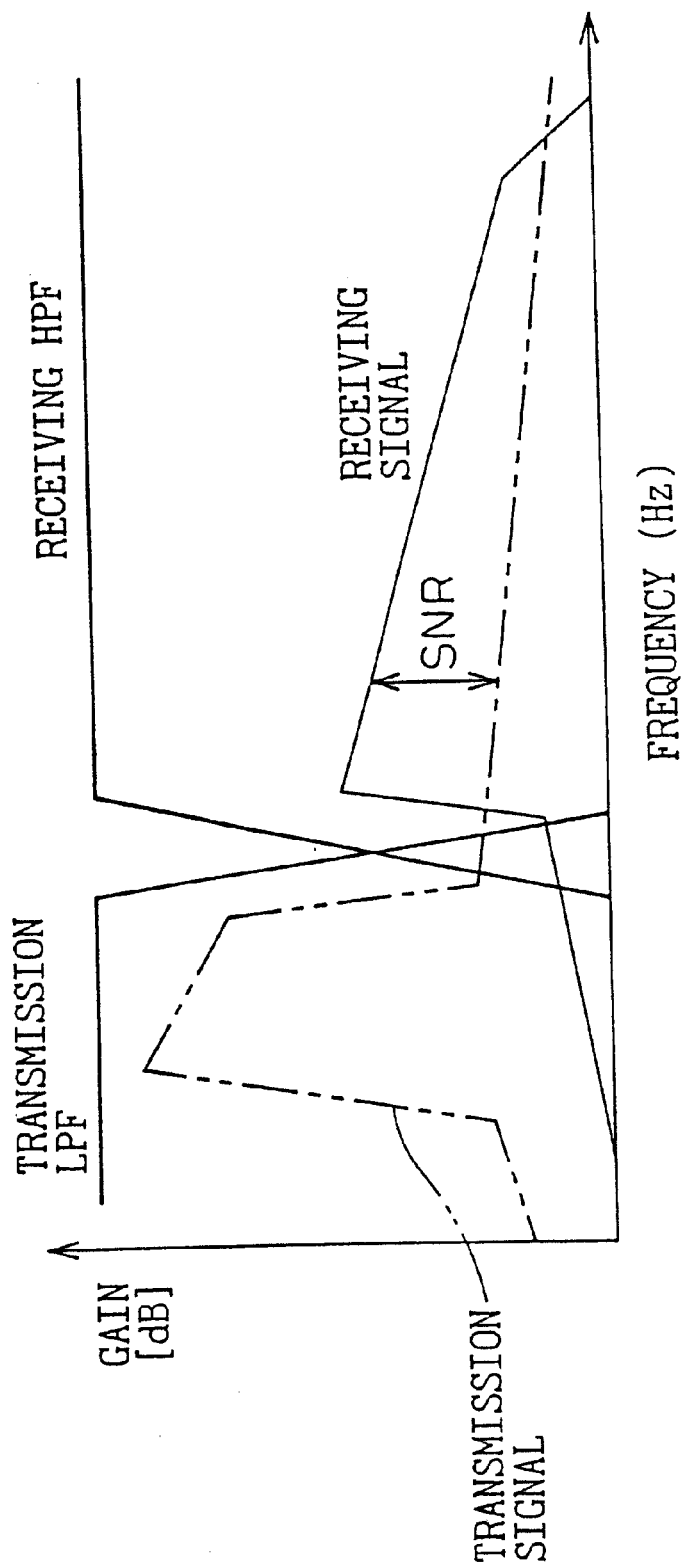
FIG. 3 is a diagram showing a spectrum of the transmission signal and the receiving signal in the conventional ADSL transceiver on the RT side.

Specifically, the training pattern transmitted leaks into the receiving side as an echo through the hybrid circuit 220 (FIG. 2). This echo is converted into a digital signal by the A/D converter 80 and held in the buffer 100. The echo, when reaching an amount corresponding to one frame, is subjected to fast Fourier transformation (hereinafter referred to as FFT) by the FFT 110. An echo frame phase detector 630 compares the FFT result signal with the transmitted pattern, and calculates the transmission delay from the phase difference between the carriers.

Next, the ADSL transceiver at the opposite party transmits a training signal, which is output from the FFT 110 through the A/D converter (ADC) 80 and the S-P buffer 100. Also, in view of the fact that this training signal is continuously transmitted in a predetermined transmission pattern, the difference between the frame boundary of the receiving signal and the present FFT section can be detected from the output of the FFT 110 by the receiving frame phase detector 610. In order to assure coincidence between the frame boundary of the receiving signal and the FFT section, the FFT boundary phase controller 620 changes the timing of input to the FFT 110 from the S-P buffer 100 by the resolution of one sample from the A/D converter 80. In the transmission frame phase controller 640, the amount of change of the transmission timing for matching the phase between the transmission frame and the receiving frame is determined from the value determined previously by the echo frame phase detector 630 and the amount of change of the FFT timing on receiving side, and the timing of sending out the transmission frame is changed by controlling the P-S buffer 41.

These steps of the process makes it possible to match the phases of the transmission frame and the receiving frame.

Figure 7:
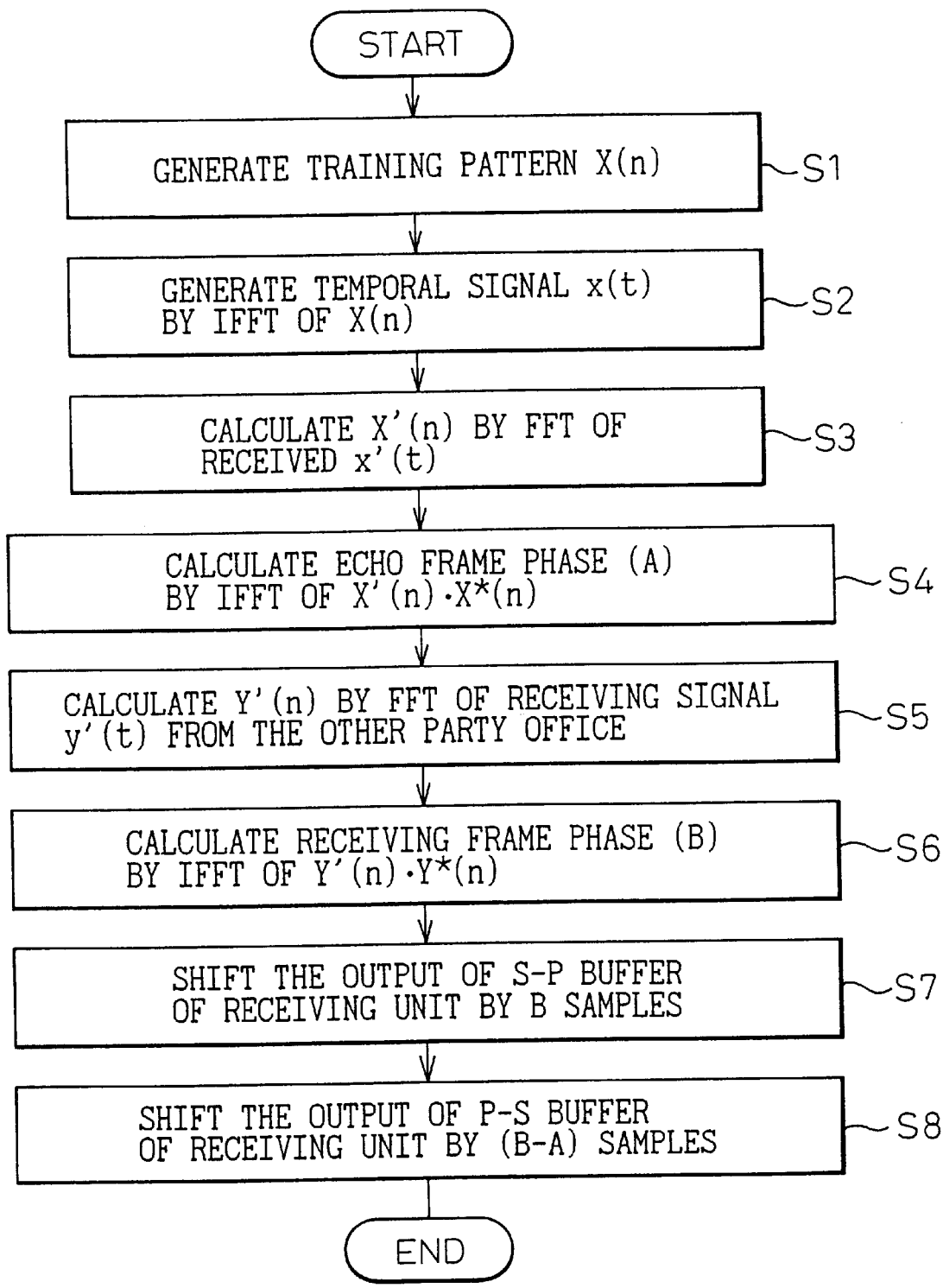
FIG. 7 is a flowchart for explaining the operation of the apparatus shown in FIG. 6.

FIG. 7 is a flowchart for explaining the operation of the apparatus shown in FIG. 6 in more detail.

In FIG. 7, the first step S1 is for a transmission pattern generating unit 600 to generate a transmission pattern X(n) for training, followed by step S2 for generating and transmitting the transmission signal x(t) by modulating the transmission pattern X(n) in the IFFT 30. This transmission signal x(t) leaks to the receiving unit from the hybrid circuit 220 (FIG. 2) and is converted into a digital signal by the A/D converter 80 as x' (t). This digital signal x' (t) is subjected to fast Fourier transformation by the FFT 110 thereby to determine X' (n) in step S3. Then, in step S4, the product of X' (n) and X*(n) which is a complex conjugate of the training transmission pattern X(n) described above is subjected to the inverse fast Fourier transform by the IFFT 30 thereby to calculate the phase (A) of the echo frame.

Then, the signal y(t) obtained by modulating the training pattern Y(n) in the IFFT at the opposite party is transmitted. This signal is transmitted to the subscriber line and enters the receiving unit of the ADSL transceiver of the own party as a receiving signal y' (t). In step S5, the receiving unit determines Y' (n) by fast Fourier transformation of the signal y' (t) by the FFT 110. Then, in step S6, the product of the complex conjugate Y' (n) of the known Y(n) and Y' (n) is subjected to inverse fast Fourier transformation in the IFFT 30 thereby to calculate the phase (B) of the receiving frame. Then, the output phase of the S-P buffer 100 of the receiving unit is shifted by B samples in order to match the FFT boundary of the receiving frame in step S7. As the last step, the output phase of the P-S buffer 41 of the transmission unit is sample shifted by (B-A) samples in step S8, thereby completing the phase matching of the echo frame.

Figure 8:
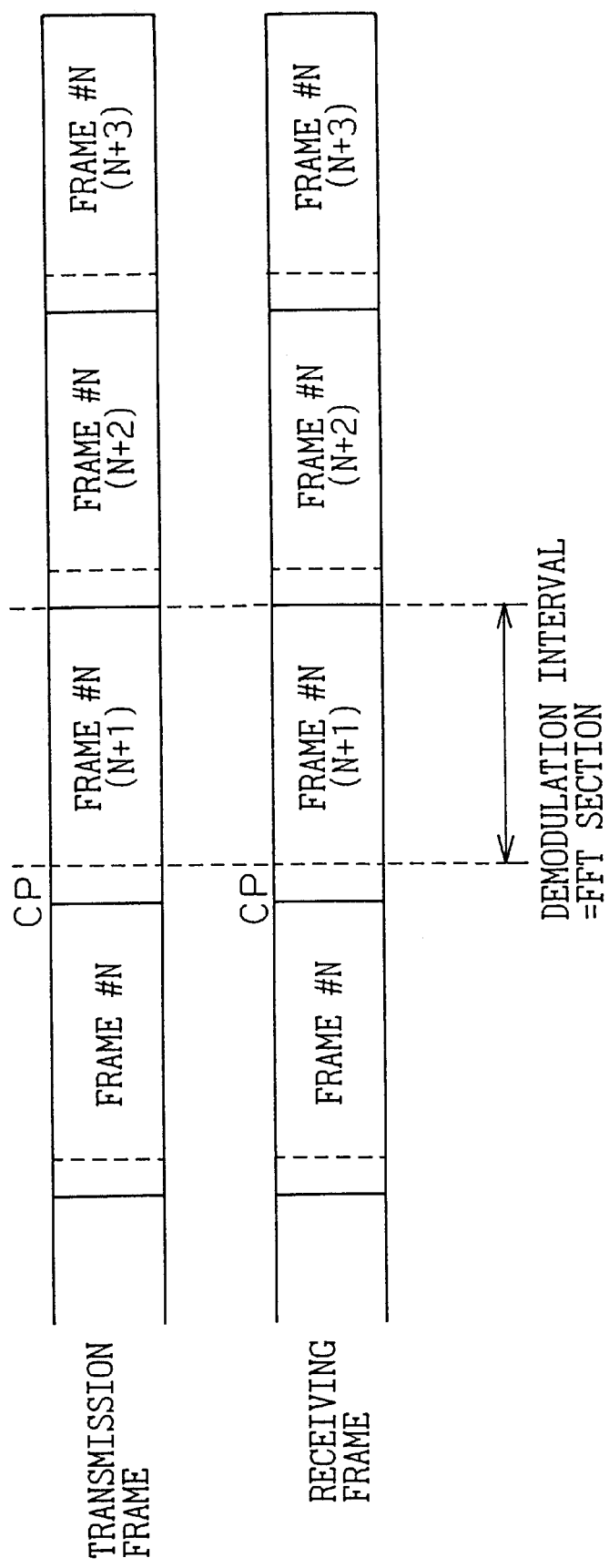
FIG. 8 is a diagram for showing the state in which the phase is matched between the transmission frame and the receiving frame.

FIG. 8 is a diagram showing the state in which the phase is matched between the transmission frame and the receiving frame. As shown in FIG. 8, no discontinuous point is contained in the FFT section, and therefore substantially no out-of-band component of the transmission signal is generated in the band of the receiving signal.

Figure 9:
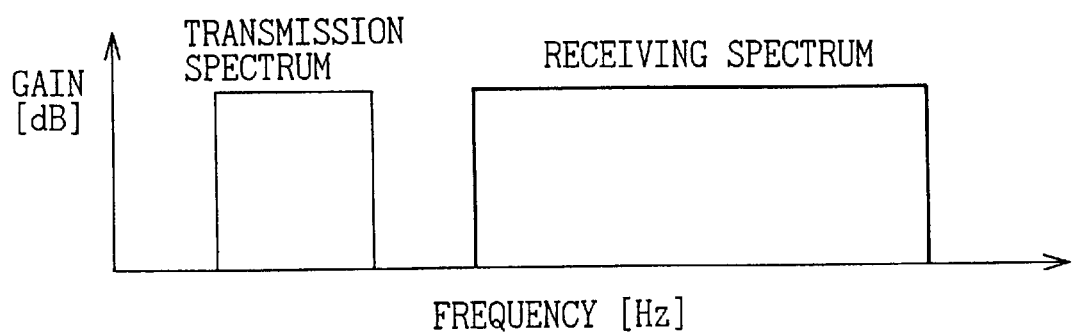
FIG. 9 is a graph showing the effect produced when the phase is matched between the transmission frame and the receiving frame.

FIG. 9 is a graph showing the effect of matching the phases between the transmission frame and the receiving frame as described above. As seen from the drawing, the configuration shown in FIG. 6 makes it possible to retrieve only the receiving signal by almost completely separating the echo signal, from the transmission unit to the receiving unit, in the demodulation by the FFT.

(iii) Adjustment of Group Delay Distortion of Echo

Figure 10:
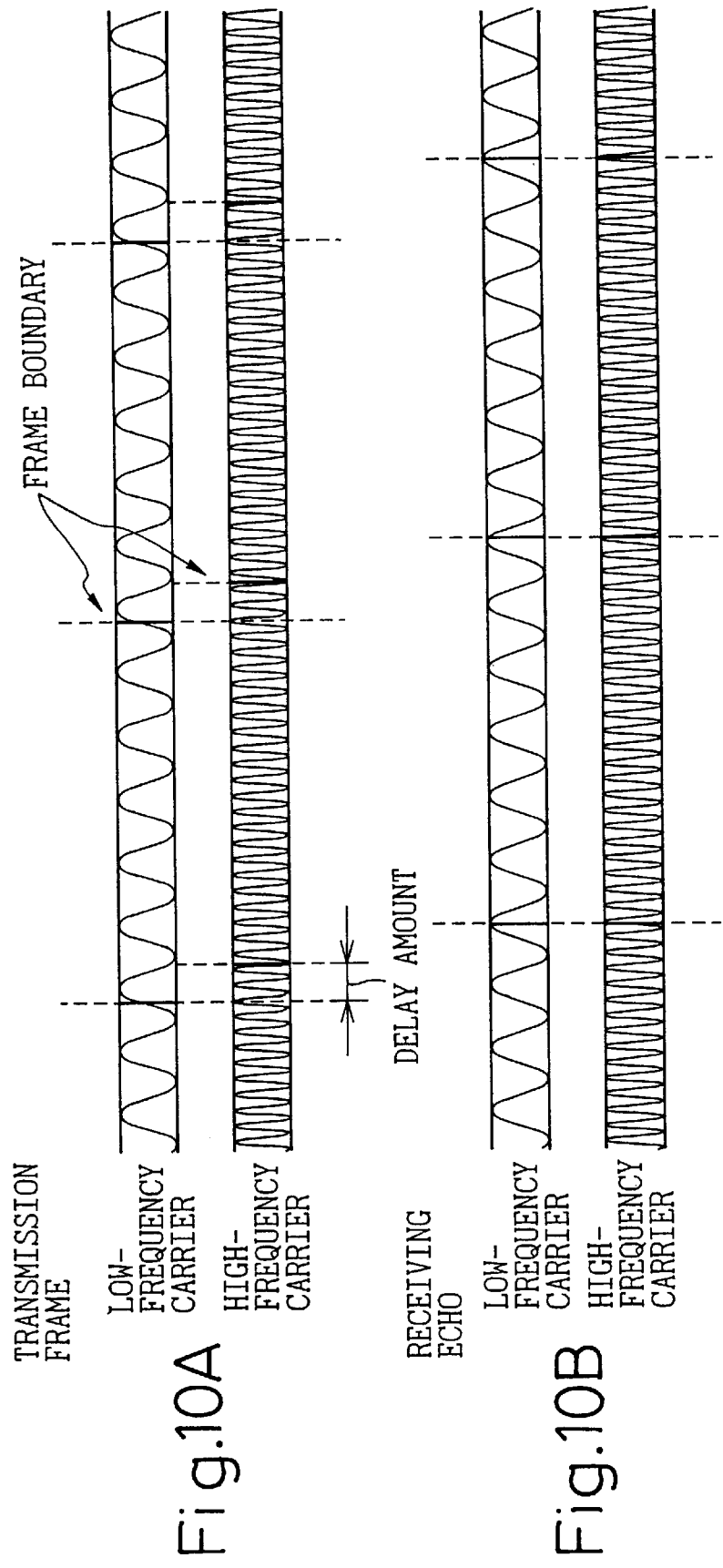
FIGS. 10A and 10B are a waveform diagrams for explaining the group delay distortion removed by the ADSL transceiver according to a second embodiment of the invention.

FIGS. 10A and 10B are waveform diagrams for explaining the group delay distortion removed by the ADSL transceiver according to a second embodiment of the invention. The echo path usually has a group delay distortion, and therefore arrives at the receiving unit at a different time depending on the DMT carrier frequency. As shown in FIG. 10A, the group delay characteristic of the echo path is the one in which the larger delay is the lower the frequency is. Therefore, according to this embodiment, a transmission signal having a lower frequency (a larger delay) is transmitted before others in such a manner as to secure the coincidence of the delay of each frequency component of the receiving signal resulting from the echo of the transmission signal. Specifically, the transmission signal is transmitted with the inverse characteristic of the group delay distortion. In this way, as shown in FIG. 10B, the frame boundaries of the DMT carriers come to coincide in the receiving unit.

(iv) Application of Group Delay Corrector to Transmission Unit

Figure 11:
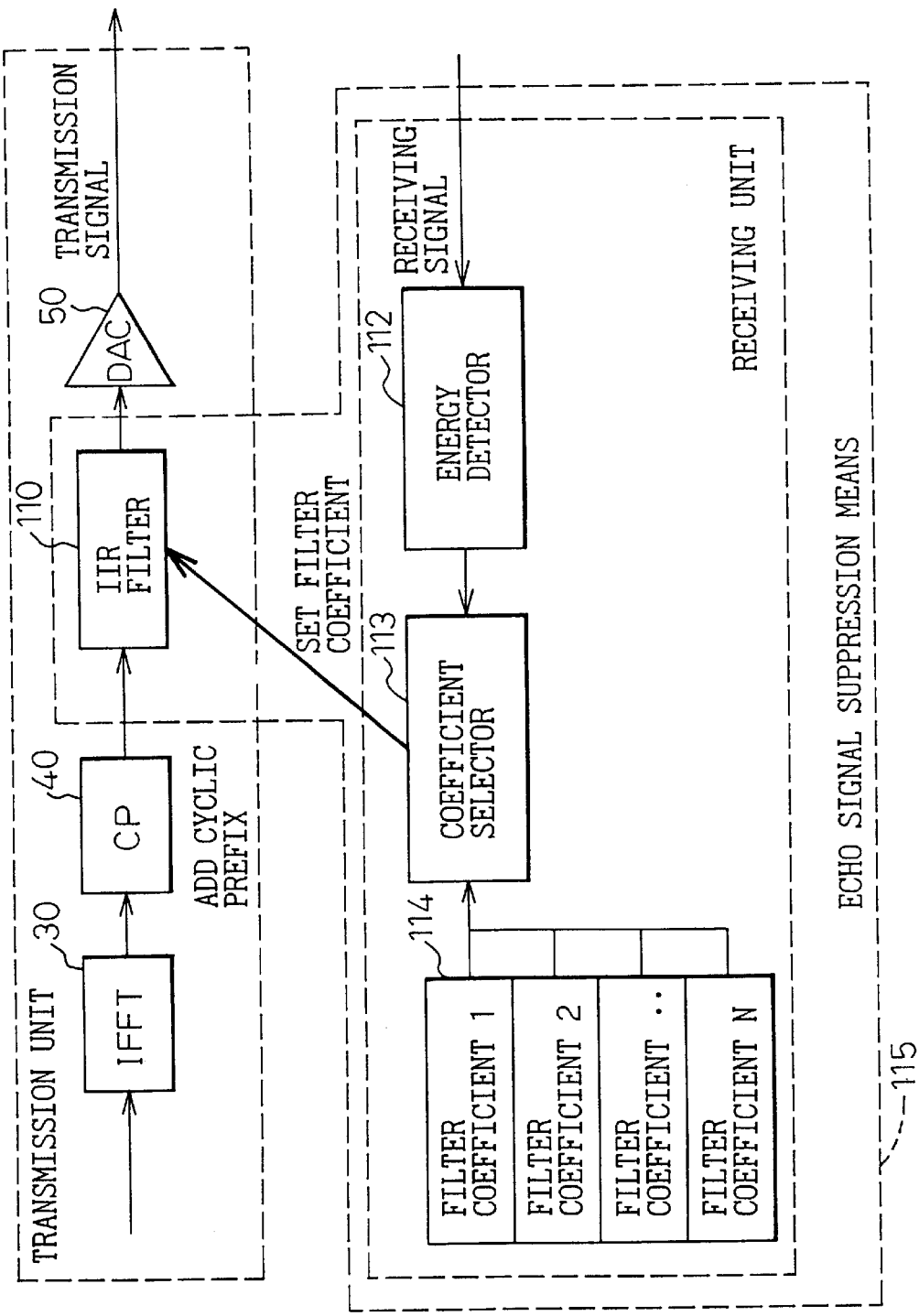
FIG. 11 is a block diagram showing a portion of the configuration of the ADSL transceiver according to a third embodiment of the invention.

FIG. 11 is a block diagram showing a portion of the configuration of the ADSL transceiver according to a third embodiment of the invention. In this embodiment, group delay distortion correction means according to the foregoing embodiment is built in the transmission unit. Specifically, an IIR filter 110 is interposed between the cyclic prefix adder 40 and the D/A converter (DAC) 50 in the transmission unit. Also, the receiving unit includes an energy detector 112 for estimating the attenuation characteristic of the subscriber line, a coefficient selector 113 for selecting a coefficient of the IIR filter 110 and a filter coefficient table 114 having N filter coefficients of the group delay IIR filter 110 in accordance with the characteristic of the subscriber line.

Now, the operation will be explained. First, the known initialization signal transmitted from the opposite party is converted into a digital signal by the A/D converter 80 (FIG. 1), and then applied to the energy detector 112. The energy detector 112 calculates the root mean square of each sample value digitized as a mean energy. This root square mean is compared with the root square mean of the known initialization signal, and the frequency attenuation characteristic of the subscriber line is estimated from the attenuation amount. The coefficient selector 113 selects the optimum filter coefficient corresponding to the attenuation characteristic of the subscriber line estimated by the energy detector 112 from the filter coefficient table 114, and sets the selected filter coefficient in the transmission IIR filter 110 of the transmission unit. This alleviates the adverse effect that the group delay distortion of the echo from the transmission unit has on the receiving signal.

Figure 12:
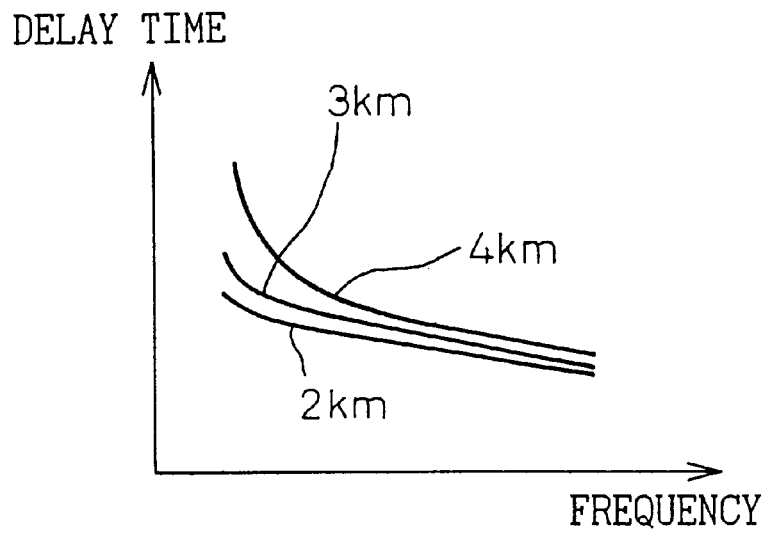
FIG. 12 is a graph showing the frequency characteristic of the group delay time of the echo.
Figure 13:
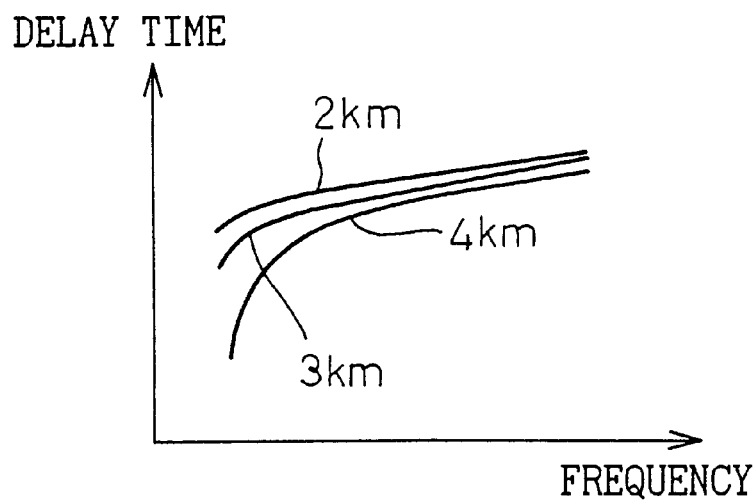
FIG. 13 is a graph showing the frequency characteristic of the IIR filter coefficient having a characteristic inverse to the group delay characteristic of the echo shown in FIG. 12.

FIG. 12 is a graph showing the frequency characteristic against the group delay time of the echo described above, and FIG. 13 is a graph showing the frequency characteristic of the IIR filter coefficient having a characteristic inverse to the group delay characteristic of the echo shown in FIG. 12. The characteristic of the IIR filter 110 for the group delay correction coefficient of the transmission unit described above will be explained with reference to FIGS. 12 and 13. As shown in FIG. 12, the group delay characteristic of the echo is varied depending on the characteristics such as the distance of the subscriber line. In the IIR filter 110, in order to correct the group delay distortion, the filter coefficients having a characteristic inverse to the group delay characteristic for each main type of the subscriber line are set in a table in advance, and the optimum filter coefficient is selected from the attenuation amount of the subscriber line determined by the energy detector 112 shown in FIG. 11 and set in the IIR filter 110 of the transmission unit.

(v) Application of Group Delay Corrector to Receiving Unit

Figure 14:
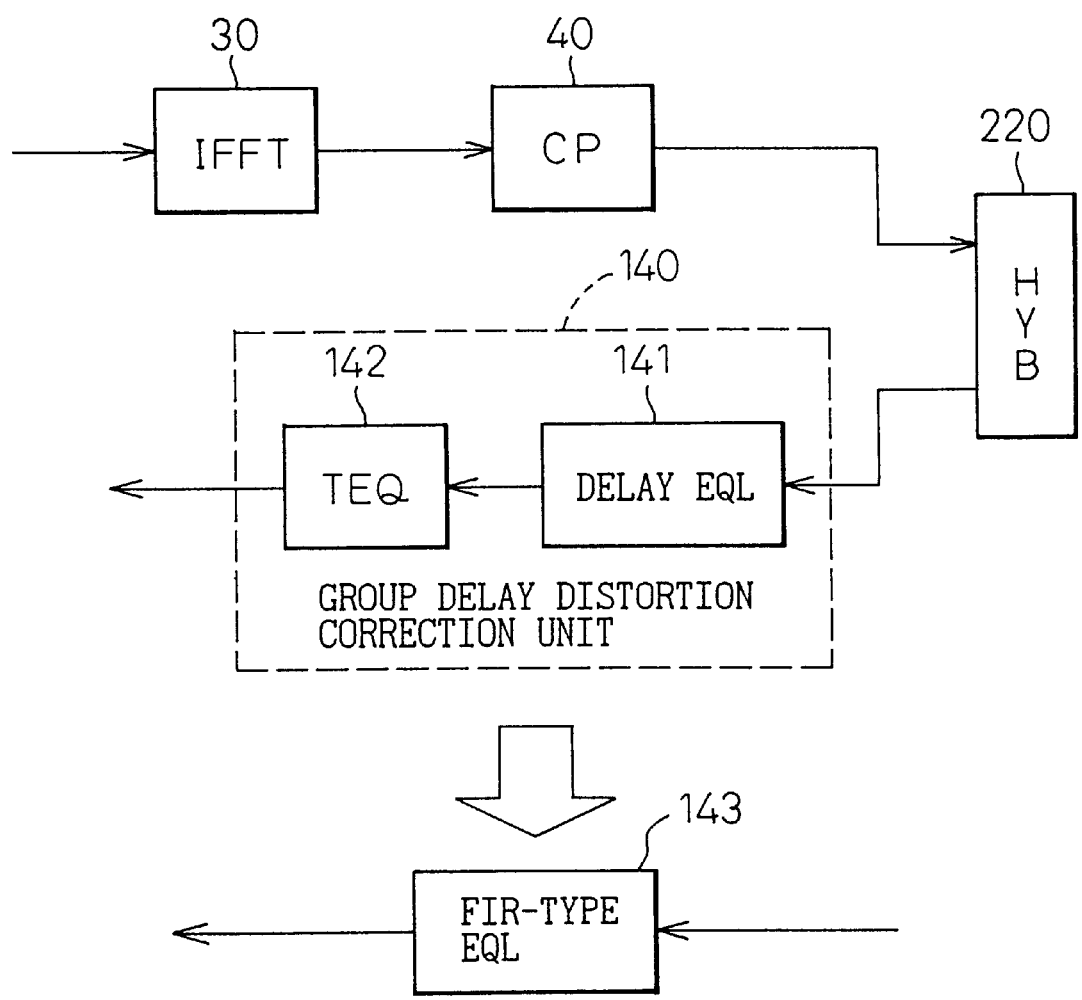
FIG. 14 is a block diagram showing a portion of the configuration of the ADSL transceiver according to a fourth embodiment of the invention.

FIG. 14 is a block diagram showing a portion of the configuration of the ADSL transceiver according to a fourth embodiment of the invention. According to this embodiment, the group delay distortion correction means according to the second embodiment described above is built in the receiving unit. Specifically, the group delay distortion correction unit 140 in the receiving unit is configured with a cascade connection between a delay equalizer (delay EQL) 141 for correcting the echo path group delay distortion and a time domain equalizer (TEQ) 142 for alleviating the inter-block interference.

Now, a method of determining the characteristic of the delay equalizer 141, i.e. a method of determining the coefficient of the delay equalizer 141 will be explained.

The frequency domain signal obtained by FFT of the echo signal of the transmission signal is multiplied by the complex conjugate of the transmitted signal, i.e. the complex conjugate of the IFFT input signal on the transmission side thereby to calculate the delay of each frequency component. Then, the inverse characteristic of the calculation result, i.e. the complex conjugate of the calculation result is used as a coefficient in the frequency domain of the delay equalizer 141. As a result, the delay equalizer 141 comes to assume a characteristic for correcting the group delay of the echo signal from the transmission signal. In the last step, a time domain coefficient is determined by IFFT of this signal and used as an actual coefficient of the delay equalizer 141.

Now, the operation will be explained. First, the known initialization signal transmitted from the opposite party is converted into a digital signal by the A/D converter 80 (FIG. 1) through the hybrid circuit 220, and then applied to the delay equalizer 141. The delay equalizer 141 develops a delay of a characteristic inverse to the line characteristic, and therefore the adverse effect that the group delay distortion in the echo path from the transmission unit has on the receiving signal is alleviated.

According to the fifth embodiment of the invention, the TEQ 142 and the delay equalizer 141 can be integrated into a single equalizer 143 of FIR type by making the delay equalizer 141 of a FIR-type filter, thereby making it possible to reduce the processing capacity. The technique for integrating the TEQ 142 and the delay equalizer 141 into a single unit can be implemented by use of either a method in which the coefficients are integrated into a single coefficient in time domain or a method in which the coefficients are integrated into a single coefficient in frequency domain. Each method will be explained in (vi) and (vii) below.

(vi) Method of Integrating Coefficients Into One in Time Domain

Figure 15:
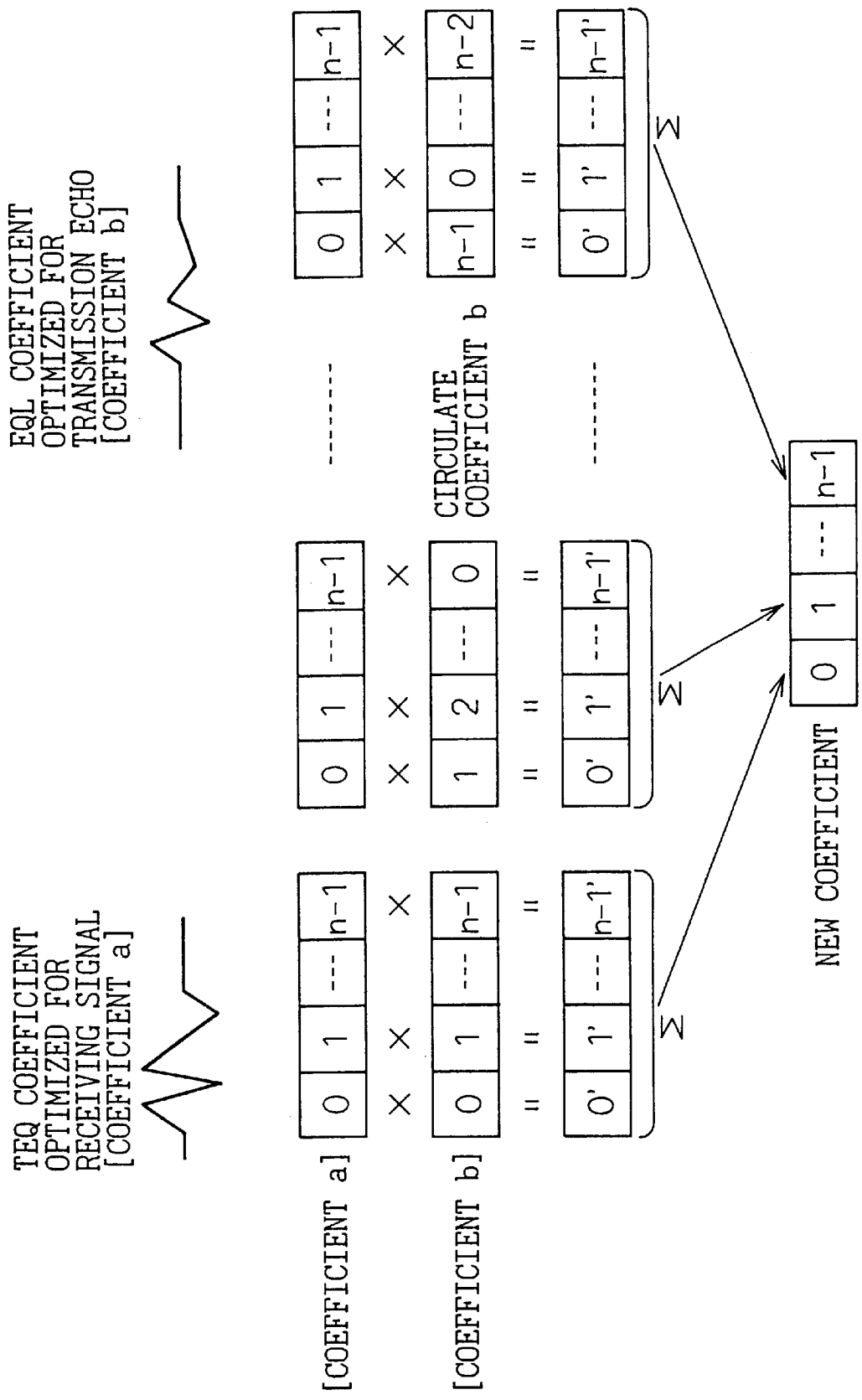
FIG. 15 is a diagram showing a method for integrating filter coefficients into a single filter coefficient in time domain.

FIG. 15 is a diagram showing a method of integrating the filter coefficients into a single coefficient in time domain. As shown in FIG. 15, a new coefficient can be obtained as a single coefficient of the FIR filter by cyclic convolution of the coefficient a optimized for the receiving signal of the TEQ 142 configured with a FIR-type filter and the coefficient b of the delay equalizer 141 optimized for the group delay of the transmission echo.

(vii) Method of Integrating Coefficients Into One in Frequency Domain

Figure 16:
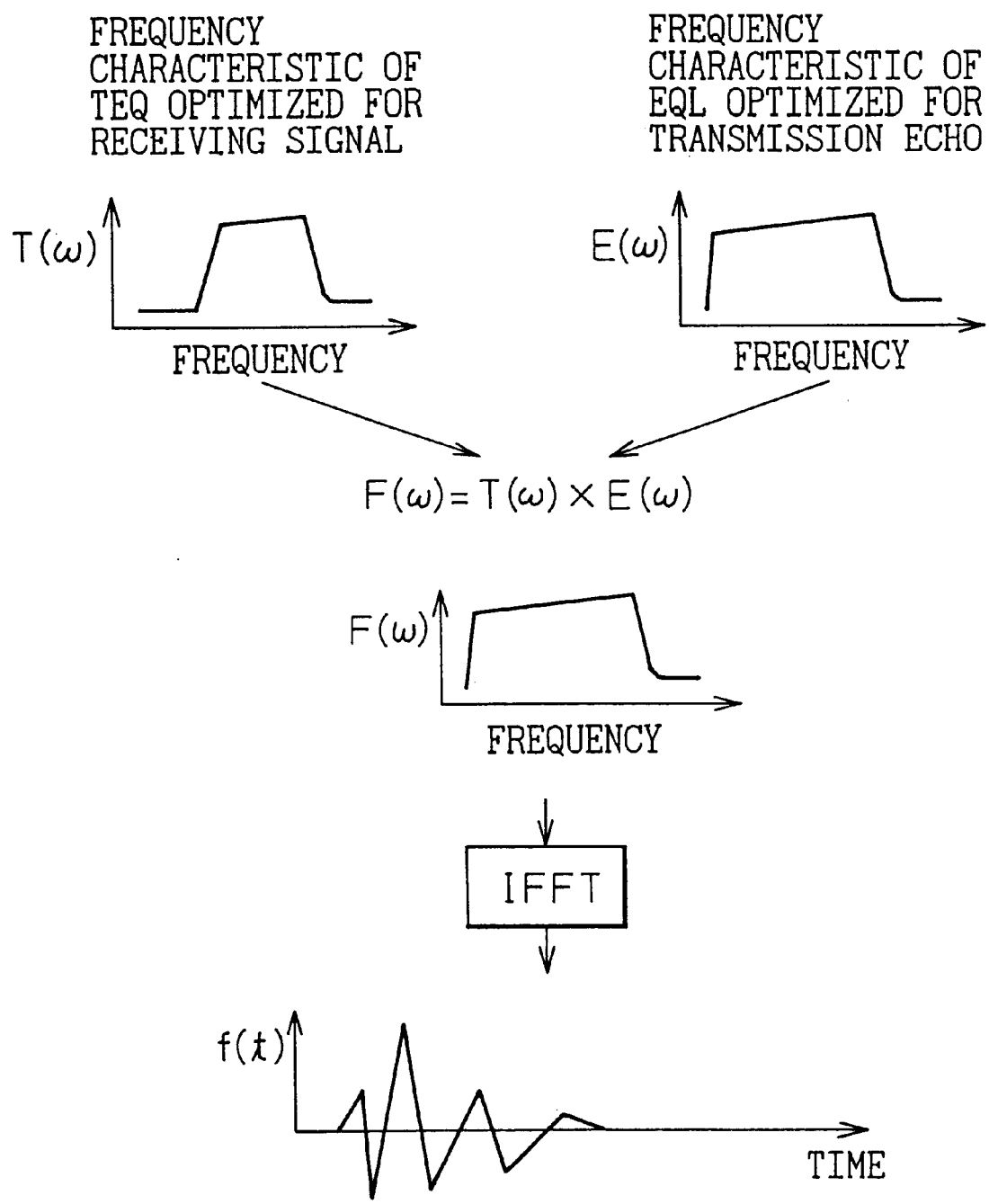
FIG. 16 is a diagram showing a method for integrating filter coefficients into a single filter coefficient in frequency domain.

FIG. 16 is a diagram showing a method of integrating the filter coefficients into a single coefficient in-frequency domain. As shown in FIG. 16, the frequency characteristic optimized for the receiving signal of the TEQ 142 is assumed to be $T(\omega)$, and the frequency characteristic optimized for the transmission echo of the delay equalizer 141 for group delay of the transmission echo, i.e. the result of FFT of the equalizer coefficient is assumed to be $E(\omega)$. Assuming that these two coefficients are integrated into a single $F(\omega)$, the relation holds that $F(\omega)=T(\omega)\times E(\omega)$. Then, the filter coefficient f(t) can be obtained by IFFT of $F(\omega)$.

(viii) Hybrid Type

FIG. 17 is a block diagram showing a configuration of a portion of the ADSL transceiver according to a sixth embodiment of the invention. This embodiment employs a hybrid type in which the group delay corrector described above is provided in both the transmission unit and the receiving unit.

As shown in FIG. 17, the transmission unit includes an IIR filter 110 like the ADSL transceiver shown in FIG. 11, and the receiving unit includes an energy detector 112, a coefficient selector 113 and a filter coefficient table 114. At the same time, like the ADSL transceiver shown in FIG. 14, the delay equalizer 141 and the TEQ 142 are connected in cascade in the receiving unit.

In operation, the attenuation amount of the receiving signal is determined by the energy detector 112, the line characteristic is estimated from the attenuation amount, and the coefficient selector 113 selects the filter coefficient most suitable for the estimated line characteristic from the filter coefficient table 114 and sets it in the transmission IIR filter 110.

Also, by employing the hybrid type for correcting the group delay distortion in the transmission and receiving units using the delay equalizer 141 for correcting the echo path group delay distortion in the receiving unit, it becomes possible to reduce the size of the IIR filter 110 in the transmission unit and the size of the delay equalizer 141 in the receiving unit.

In the embodiments mentioned above, the ADSL transceiver was referred to for explanation. Nevertheless, it is apparent to those skilled in the art that the present invention is applicable also to the xDSL transceivers other than ADSL transceiver.

As described above, this invention has the following effects.

By matching the phase of the transmission frame with that of the receiving frame, the effect of the noise component, which is influenced by the echo from the transmission unit to the receiving unit, in the receiving signal, can be suppressed. Also, the quality of echo removal can be improved by correcting the group delay distortion of the echo path. Also, the amount of data to be processed can be reduced by combining with the TEQ filter.

What is claimed is:

1. An xDSL transceiver comprising a transmission unit for transmitting a DMT-modulated signal through a subscriber line as a transmission path and a receiving unit for receiving the DMT-modulated signal from said subscriber line, comprising an echo signal suppression unit for suppressing an echo signal from said transmission unit to said receiving unit by matching the phase of the frame of the transmission signal with that of the frame of the receiving signal, wherein phases of transmission signal frames and receiving signal frames are matched to prevent discontinuities between transmission signal frames and receiving signal frames from occurring during a demodulation period for receiving signal frames, thereby preventing out-of-band components of the transmission signal from being generated in the band of the receiving signal.

2. An xDSL transceiver as described in claim 1, wherein said transmission unit includes said echo signal suppression unit, and said echo signal suppression unit includes a phase compensator for making the same frame boundary of the carrier of said echo signal from said transmission unit to said receiving unit for all the frequencies.

3. An xDSL transceiver as described in claim 2, wherein said receiving unit includes phase compensation degree determining unit for determining the degree of phase compensation of said phase compensator in said transmission unit by analyzing said receiving signal.

4. An xDSL transceiver as described in claim 1, wherein said receiving unit includes said echo signal suppression unit, and said echo signal suppression unit includes a phase compensator for making the same frame boundary of the carrier of said echo signal from said transmission unit to said receiving unit for all the frequencies.

5. An xDSL transceiver as described in claim 4, wherein said phase compensator is configured with a cascade connection of a delay equalizer for correcting the group delay distortion of the echo signal from said transmission unit and a time domain equalizer for relaxing the inter-block interference in the output of said delay equalizer.

6. An xDSL transceiver as described in claim 4, wherein said phase compensator is configured with a single FIR-type equalizer having the same function as a cascade connection of a delay equalizer for correcting the group delay distortion of the echo signal from said transmission unit and a time domain equalizer for reducing the inter-block interference in the output of said delay equalizer.

7. An xDSL transceiver as described in claim 1, wherein said transmission unit includes a portion of said echo signal suppression unit and said receiving means includes the other portion of said echo signal suppression unit.

* * * * *